United States Patent [19]

Anderson

[11] Patent Number: 4,918,810
[45] Date of Patent: Apr. 24, 1990

[54] STRUCTURE FOR SECURING COMPOSITE MEMBERS TOGETHER

[76] Inventor: Richard N. Anderson, 9885 Melba La., Whitesville, Ky. 42378

[21] Appl. No.: 193,816

[22] Filed: Oct. 3, 1980

[51] Int. Cl.⁵ .............................................. B23P 19/00
[52] U.S. Cl. .................................... 29/798; 29/432.1; 29/897.31
[58] Field of Search ............. 29/243.5, 243.57, 243.58, 29/509, 514, 155 R, 432.1, 798

[56] References Cited

U.S. PATENT DOCUMENTS

| | | | |
|---|---|---|---|
| 2,450,987 | 10/1948 | Potter | 29/514 U X |
| 3,113,083 | 12/1967 | Silvester | 29/514 U X |
| 3,477,485 | 11/1969 | Talbott | 29/155 R X |
| 3,528,167 | 9/1970 | Lipp | 29/509 |
| 3,722,052 | 3/1973 | Toti | 29/509 X |
| 4,125,936 | 11/1978 | Rozmus | 29/509 X |
| 4,194,284 | 3/1980 | Diels et al. | 29/509 |
| 4,287,658 | 9/1981 | Egerer | 29/243.58 |

Primary Examiner—Robert L. Spruill

[57] ABSTRACT

Structure for and method of securing members of different material together. The structure includes pairs of adjustable opposed rollers through which a first and second member having different physical characteristics are guided toward deforming structure in a desired composite relation and deforming structure including opposed rollers for guiding the composite member through the deforming structure, and a rotary deforming disc having radially extending intermittent projections thereon for intermittently deforming a portion of the first member into the second member and driving the composite member through the deforming structure. The method includes moving the members in composite relation through the guide structure to the deforming structure and rotating the deforming disc to intermittently deform a portion of the first member into the second member while guiding the composite member through the deforming structure.

22 Claims, 4 Drawing Sheets

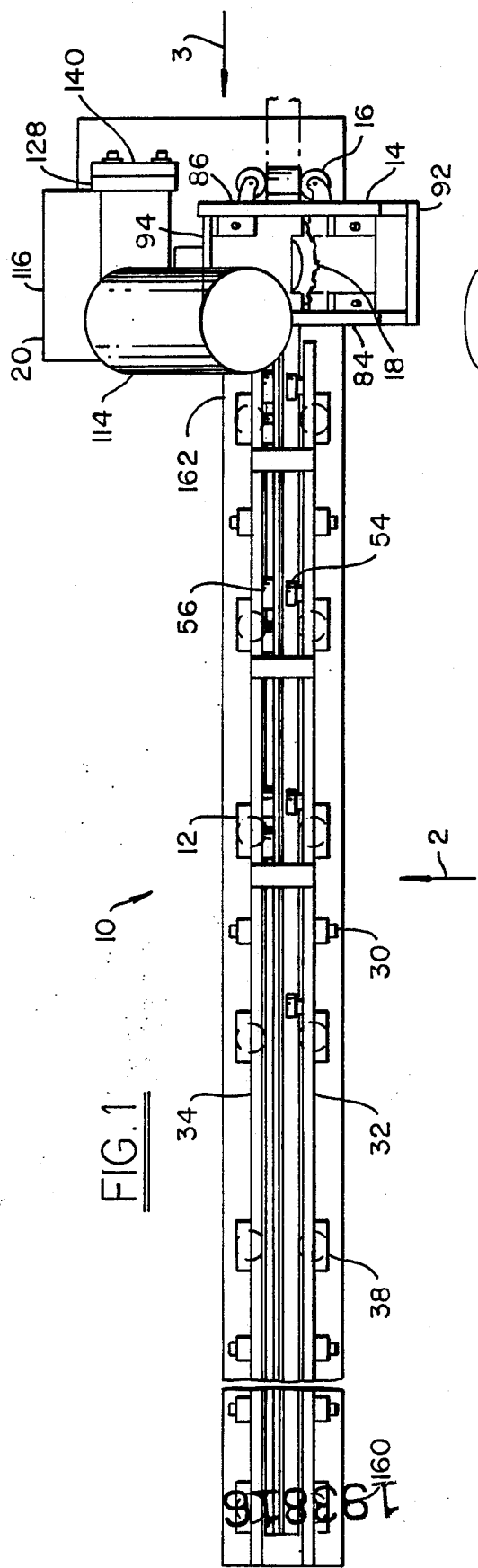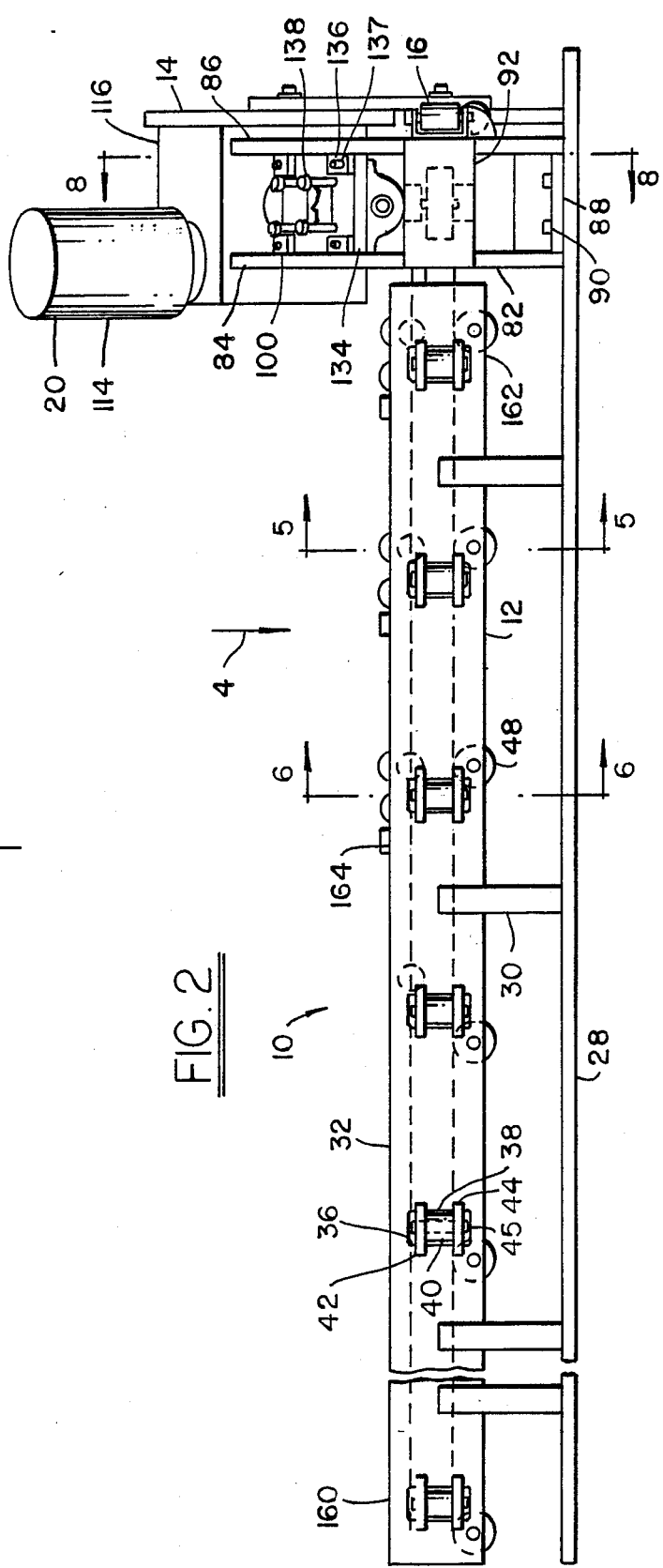

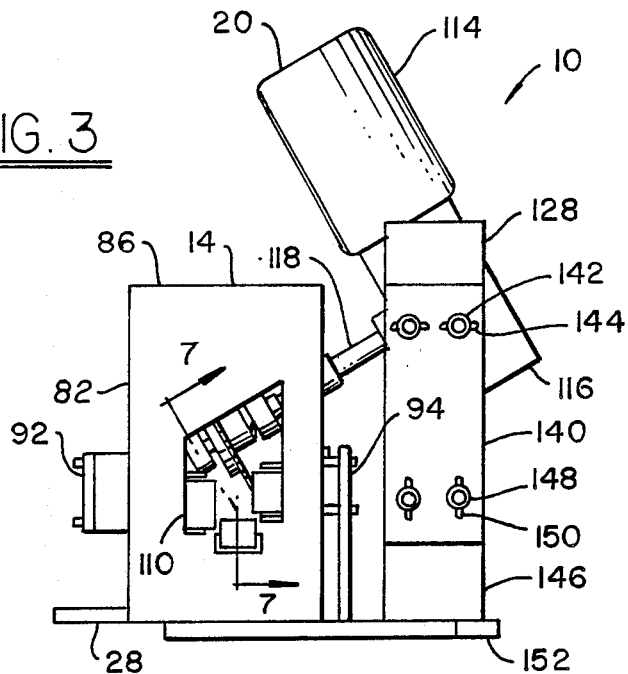
FIG. 3
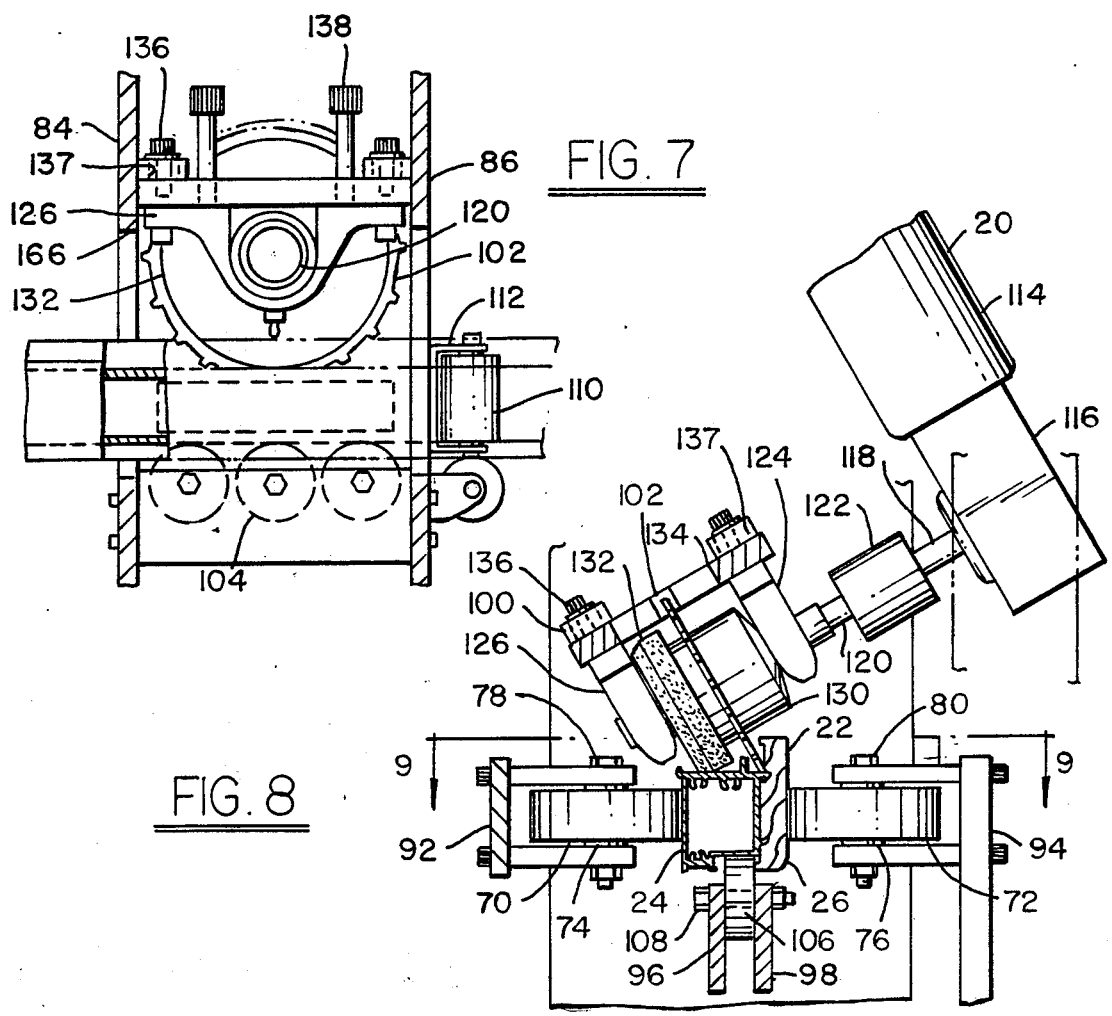
FIG. 7
FIG. 8

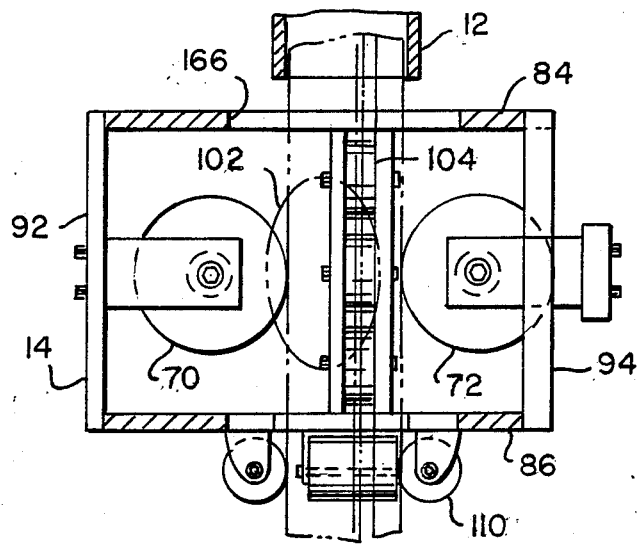
FIG. 9
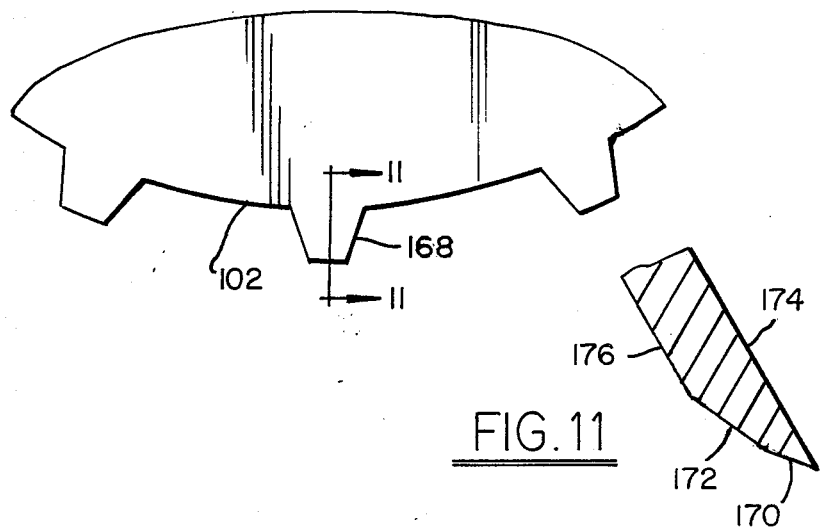
FIG. 10
FIG. 11
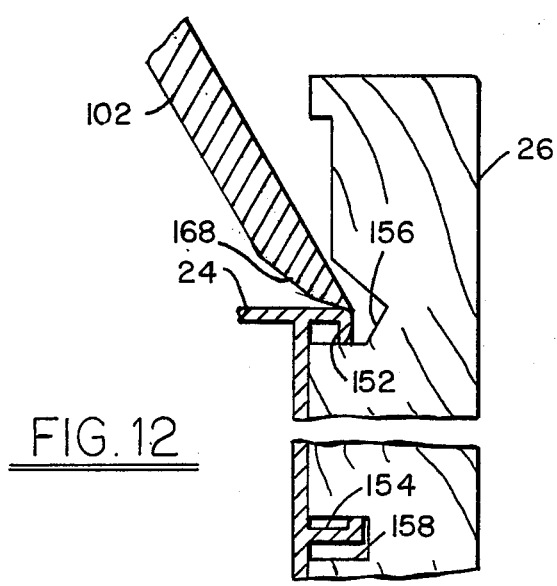
FIG. 12
FIG. 13

STRUCTURE FOR SECURING COMPOSITE MEMBERS TOGETHER

BACKGROUND OF THE INVENTION

1. Field of the Invention

The invention relates to securing different materials together into a composite member and refers more specifically to structure for and method of securing materials such as wood and metal together to provide a composite building member utilizing the best qualities of each material.

2. Description of the Prior Art

In the past, combining different materials into a composite member has been difficult, particularly where one of the materials has been rigid but comparatively soft and/or porous such as wood, and the other material has been harder and/or non-porous such as metal. This has been particularly true where the materials have had different coefficients of thermal expansion or have had different reactions to varying humidity.

Such composite materials have been difficult to produce in the past since it is desired to achieve the lamination of the materials together without the use of adhesives or separate fasteners. Also, the resulting joint between the members must be mechanically stable and structurally sound as only limited by the physical properties of the weaker material.

Attempts have been made to construct such composite members by a linear slide fit, for example, wherein one member is physically slid over a prepared surface on the other member. Such slide fit assemblies are however not always practical, since one or both members may be too bowed and/or twisted to fit together and still slide for any distance with reasonable design tolerance.

It has also been suggested in the past that a snap fit be used to assemble composite members. In assembly of such composite members, one member is constructed to snap over another member. However, snap fit connections for composite members are not always practical unless at least one of the materials is resilient enough to effect appreciable deformation while being fitted and the other material is either resilient or sufficiently strong so as not to be deformed in the assembly process.

SUMMARY OF THE INVENTION

In accordance with the invention, it is the intention to provide a structure for and method of securing members of different properties together into a composite member which will be equally as effective with members and materials which are capable of being slip-fit or snap-fit and with members and materials not suitable for either of the prior art techniques.

According to the invention, a material which is generally harder, stronger, less porous and more malleable, that is, for example, a metal such as aluminum, is formed with opposed flanges thereon, and a material which is softer, weaker, more porous and less malleable, that is, for example, wood, is provided with a portion extending between the flanges and at least one flange of the harder material is deformed to extend into the softer material, thus rigidly securing the members together into a single composite member. The flange may be continuously or intermittently deformed and the other flange may, if necessary, be supported during securing of the members of different material into a single composite member to limit deformation thereof. Also, the deformation of the one flange is accomplished at an angle to the one flange so as to reduce visibility of the deformation in accordance with the invention.

The specific structure for accomplishing the securing of the members of different material into a single composite member includes guide means for guiding the relatively harder and relatively softer members into deforming structure in predetermined exact relative relation to each other, and deformation structure including guide means for guiding the composite member through the deforming structure, and means for intermittently deforming the harder of the materials into the softer of the materials as it passes through the deforming structure.

The method of the invention includes guiding the harder and softer members into the deforming structure with the members in the position it is desired to have them in, in the composite member, and deforming the harder member into the softer member to secure the members of different material together into a single composite member while guiding the composite member through deforming structure.

BRIEF DESCRIPTION OF THE DRAWINGS

FIG. 1 is a broken top view of structure for securing composite members together in accordance with the method of the invention.

FIG. 2 is a broken elevation view of the structure for securing composite members together shown in FIG. 1, taken substantially in the direction of arrow 2 in FIG. 1.

FIG. 3 is an end view of the structure illustrated in FIGS. 1 and 2, taken substantially in the direction of arrow 3 in FIG. 1.

FIG. 7 is an enlarged partial section view of the structure illustrated in FIGS. 1-3, taken substantially on the line 7—7 in FIG. 3.

FIG. 8 is an enlarged partial section view of the structure illustrated in FIGS. 1-3, taken substantially on the line 8—8 in FIG. 2.

FIG. 9 is an enlarged partial section view of the structure illustrated in FIGS. 1-3, taken substantially on the line 9—9 in FIG. 8.

FIG. 10 is an enlarged partial elevation view of the deforming disc of the structure illustrated in FIGS. 1-3.

FIG. 11 is a partial section view of the deforming disc illustrated in FIG. 10, taken substantially on the line 11—11 in FIG. 10.

FIG. 12 is an enlarged diagrammatic view of a portion of the deforming disc of the structure illustrated in FIGS. 1-3 prior to engagement with a composite member to be formed by the method of the invention with the structure of FIGS. 1-3.

FIG. 13 is an enlarged partial section view similar to the view of FIG. 12 but showing the deforming disc and composite member after the composite member has been deformed by the deforming disc.

DESCRIPTION OF THE PREFERRED EMBODIMENT

Figure 4:
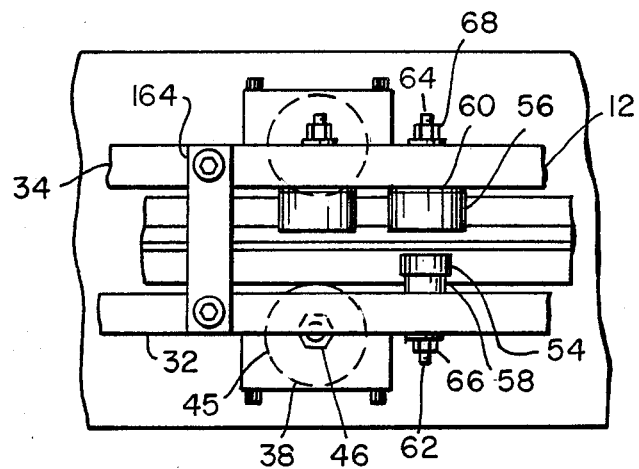
FIG. 4 is an enlarged partial top view of the structure illustrated in FIGS. 1-3, taken substantially in the direction of arrow 4 in FIG. 2.

The structure 10 for securing composite members together, in accordance with the invention, includes the guide structure 12 and the deforming structure 14. The deforming structure 14 includes its own guide means 16, deforming disc structure 18 and drive structure 20.

In accordance with the method of the invention, a member 24 of a material such as metal and a member 26 of a material such as wood in predetermined relation to each other are guided in guide structure 12 toward the deforming structure 14. The member 24 is then deformed in the deforming structure 14 to secure the member 24 and member 26 together to form the single composite member 22.

Figure 5:
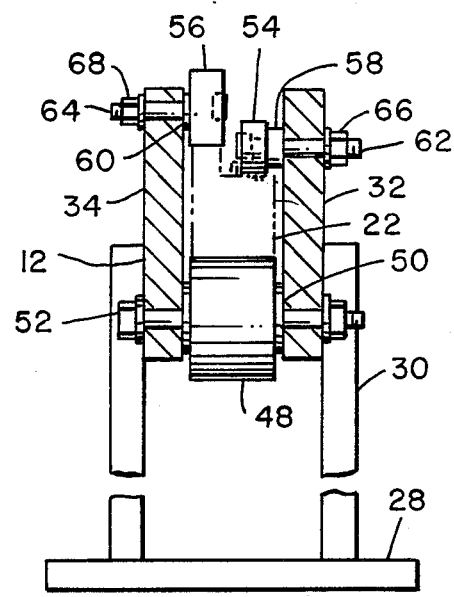
FIG. 5 is an enlarged broken partial section view of the structure illustrated in FIGS. 1-3, taken substantially on the line 5—5 in FIG. 2.
Figure 6:
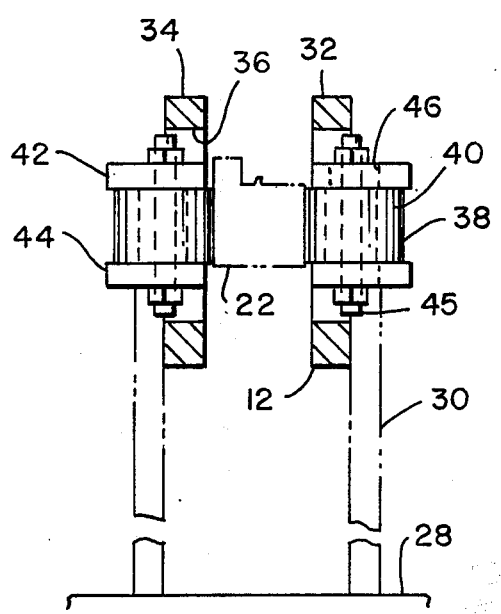
FIG. 6 is an enlarged broken partial section view of the structure illustrated in FIGS. 1-3, taken substantially on the line 6—6 in FIG. 2.

More specifically, the guide structure 12, as shown in more detail in FIGS. 4, 5 and 6, includes an elongated rigid metal base plate 28 and metal struts or legs 30 connected to the rigid metal base plate 28 by convenient means such as welding, supporting the elongated parallel metal plates 32 and 34 in parallel spaced apart relation above the base plate 28. The struts 30 may again be secured to the metal plates 32 and 34 by convenient means such as welding.

As shown, plates 32 and 34 have generally rectangular recesses 36 extending therethrough in which rollers 38 are rotatably mounted on spindles 40 secured to horizontally extending bracket members 42 and 44 by convenient means such as nut and bolt structures 45. As shown better in FIGS. 4 and 6, the rollers 38 mounted on plate 32 may be moved individually toward and away from the plate 34 in the slots 46.

Rollers 48 are also provided extending between the plates 32 and 34 as best shown in FIG. 5 for rotation on spindles 50 held in place by nut and bolt structures 52. The rollers 48 are provided at longitudinally spaced apart locations on the plates 32 and 34, as shown best in FIG. 2.

Rollers 54 and 56 are also provided on spindles 58 and 60 respectively held in position on the plates 32 and 34 over the rollers 48 by convenient means such as the bolts 62 and 64 and associated nuts 66 and 68 shown best in FIGS. 4 and 5.

The guide means 16 of the deforming structure 14, as best shown in FIGS. 7 and 8, includes the compression guide rollers 70 and 72, again mounted on spindles 74 and 76 which are held in place by nut and bolt structures 78 and 80 respectively. The rollers 70 and 72 are spaced apart substantially the same width as the rollers 38 on the metal plates 32 and 34 and are supported from the frame 82 of the deforming structure 14. Rollers 70 and 72 may be made of slightly resilient material or may be metal coated with slightly resilient material to accommodate slight variations in members 24 and 26, if desired.

The frame 82 includes the vertical plates 84 and 86 and the spacing member 88 secured to the base plate 28 by convenient means such as bolts 90 or the like. Frame 82 also includes the plate structure 92, shown best in FIG. 8, connected to the plates 84 and 86 and the plate structure 94 connected to the plate 28 adjacent plates 84 and 86 for supporting the rollers 70 and 72. In addition, a pair of plates 96 and 98 extend between the plates 84 and 86 centrally thereof, as shown in FIG. 8. Also, four slotted tabs 100 are secured, two to each of the plates 84 and 86, by convenient means such as welding to support the deforming disc structure 18, as will be seen subsequently.

The guide means 16 of the deforming structure 14 further includes three aligned rollers 104, as best shown in FIGS. 7, 8 and 9, rotatably mounted on spindles 106 and secured between the plates 96 and 98 by convenient means such as bolt and nut structures 108. As will be noted, the rollers 104 are smaller than the rollers 70 and 72. The middle roller 104 has an axis positioned in the same plane as the axis of the rollers 70 and 72 and the plane of the axis of the deforming disc 102. The rollers 104 are small to assure exact support of the member 24 beneath the deforming disc 102, by the center roller 104 and to insure support of the member 24 on each side of the axis of the deforming disc close enough to the disc to prevent bending or twisting of the member 24 during its deformation to secure it together with the member 26.

Guide means 16 further includes three rollers 110 positioned as shown best in FIGS. 3, 7 and 9 for guiding the composite member 22 on its movement out of the deforming structure 14. Rollers 110 are mounted on brackets 112 which may be bolted to plate 86.

The drive means 20 for the deforming disc 18, as shown best in FIG. 8, includes an electric motor 114 and gear box 116 for driving a shaft 118 which is coupled to shaft 120 through coupling structure 122. Shaft 120 is journaled in bearings 124 and 126 for rotation therein and includes thereon the deforming disc 102, a backing member 130 and friction drive member 132.

The bearings 124 and 126 are mounted on plate 134 by bolts 136 extending through adjusting slots 137 in tabs 100. Adjusting bolts 138 also extend through the plate 134 and in conjunction with the bolts 136 fix the exact location of the bearings 124 and 126 and thus the location of the deforming disc 102.

The gear box 116 is mounted as by bolts (not shown) to a top plate 128. Plate 128 is in turn mounted on a middle plate 140 by bolts 142 in slots 144. The middle plate 140 is then mounted on lower plate 146 by bolts 148 in slots 150. Plate 146 may be secured to the base plate 152, which may be an offset extension of base plate 28, by convenient means such as welding or the like. Thus, the entire drive means 20 may be moved axially of the shaft 120 on loosening of the bolts 136 and the bolts 142 and 148. Additionally, the angle that the deforming disc 102 makes with the composite member 22 may be varied by varying the angle of the shaft 120 on varying the adjusting nuts 138 in conjunction with the bolts 136, with the bolts 142 and 148 loose to permit movement thereof in the slots 144 and 150.

In overall operation of the structure 10 for securing members together into a composite member, an elongated member 24 which may be aluminum for example, shaped in cross section as shown best in FIG. 8, is placed in contact with an elongated member 26 which may be wood for example having a cross section also as shown best in FIG. 8 with the opposed flanges 152 and 154 of the member 24 cross section extending into the longitudinally extending slots 156 and 158 in the member 26 as best shown in FIG. 12. The member 26 and member 24 so positioned relative to each other are fed into the guide structure 12 in the location shown in FIGS. 5 and 6 in phantom.

The member 24 and member 26 are securely held together during traverse of the guide structure 12, at first by the rollers 48 and by the opposed rollers 38. As pointed out above, the opposed rollers 38 secured in the plate 32 are adjustable toward and away from the plate 34. In fact, as the rollers 38 progress from the end 160 toward the end 162 of the guide structure 12, the rollers 38 are positioned progressively closer to the plate 34. The metal member 24 and wood member 26 are thus urged into intimate contact to exactly position them immediately prior to their entry into the deforming structure 14.

As the member 24 and member 26 approach the end 162 of the guide structure 12, the rollers 54 and 56 engage the member 24 and member 26 respectively to exactly position the member 24 and member 26 vertically in conjunction with the rollers 48. It will be understood that any or all of the rollers may be adjustable to accommodate members of different size and/or to provide more or less movement of the members 24 and 26 toward each other as they progress down the guide structure 12.

The cross members 164 are provided at the end 162 of the guide structure 12 to insure proper alignment and spacing of the plates 32 and 34. Members 164 are placed in tension in opposition to squeezing of the member 24 and member 26 between the opposed rollers 38 of the guide structure 12.

The member 24 and member 26 may be hand fed into the guide structure 12 and manually pushed therethrough, or one or more of the rollers may be driven and frictionally engage the members 24 and 26, or means may be provided for mechanically pushing the members 24 and 26 through the guide structure 12, as for example, a hydraulic cylinder adjacent the end 162 of the guide structure having a piston and piston rod engageable with the end of the members 24 and 26. Such structure is not shown since it has been found that manually feeding the metal and wood members through the guide structure 12 is acceptable procedure.

As the member 24 and member 26 enter the deforming structure 14 through the opening 166 in plate 84, as shown in FIGS. 7 and 9, they are guided in close relation with each other by the rollers 70, 72 and 104, as shown best in FIG. 8. At the plane of the axis of the rollers 70 and 76 and center roller 104, the deforming disc 102 will engage the flange 152 of member 24 at an angle with one of the projections 168 thereof adjacent the outer end of the flange 152 and within recess 156 in member 26 as best shown in FIG. 12. Initial engagement between the projection 168 of the disc 102 and the flange 152 is at the outer extremity of the flange, as shown best in FIG. 12, to provide initial bending of the flange from the outer end of the flange 152 from which bending is easiest to produce.

As the deforming disc 102 continues to rotate, the projection 168 will continue deforming the flange 152 to bend it closer to its base and force it into the member 26 in the groove 156, as shown in FIG. 13. At this time, the flange 154 in the groove 158 is also forced into the member 26, again as shown best in FIG. 13. Ultimately the projection 168 of the disc 102 will emerge from the slot 156 with a portion of the flange 152 in the position shown best in FIG. 13 and with the member 24 and the member 26 securely fastened together.

It will be noted that the groove 156 is slightly enlarged to permit the deforming disc 102 to enter into the groove 156 at a substantial angle as shown in FIG. 12 to deform the flange 152. Further, it will be noted that since the deforming projections 168 are intermittent on the disc 102 that the flange 152 will be intermittently forced into the softer member 26 to secure the member 26 to the harder member 24. The resultant composite metal and wood member has the appearance of having been stitched together at the flange 152. Further, because the deformation of the flange 152 is accomplished at an angle in recess 156 by disc 102, the intermittent deformation or stitching will be substantially hidden.

As shown best in FIG. 11, the deforming projections 168 on the disc 102 have an outer edge or tip 170 sharpened to a point determined by the angle required in the projection 168 to first deform the flange 152 at its outer edge and the strength necessary to so deform the flange 52. The projection 168 further has a second edge 172 between the parallel sides 174 and 176 thereof, the angle of which is determined by the distance from the base of the flange 152 it is desired to stop the deformation of the flange 152. Thus edge 170 actually engages flange 152 adjacent its outer end to cause deformation thereof while edge 172 provides clearance for the disc 102.

As the composite member 22 passes by the deforming disc 102, the composite member 22 is intermittently pulled through the guide structure 12 and the deforming structure 14 by the projections 168. In between times when the composite member 22 is pulled through the deforming structure 14 by the deforming disc 102, the friction drive member 132 in contact with the member 24 of the composite member 22 will drive the composite member 22 through the deforming structure 14 at a slightly slower rate.

As pointed out above, prior to feeding the members 24 and 26 through the structure 10, the guide rollers 38 on plate 32 are adjusted as required to guide the particular members to be secured together into the deforming structure in the desired relative position and the drive structure is adjusted to provide the required deformation of the member 24 to secure the members 24 and 26 together into a single composite member without additional structure.

While one embodiment of the present invention has been considered in detail, it will be understood that other embodiments and modifications thereof are contemplated by the inventor. Thus, for example, all of the rollers may be adjustable to accommodate composite members of different size and shape and to facilitate leading into the deforming structure of members having different size and shape in different relative positions. Also it will be understood that while the invention has been considered in conjunction with a metal and wood composite building member, that it has application with other materials in making composite members for use in other fields as well as in the building field. It is the intention to include all embodiments and modifications as are defined by the appended claims within the scope of the invention.

I claim:

1. Structure for securing an elongated wood member having longitudinally extending spaced apart recesses in one side thereof to an elongated metal member having at least one substantially flat side with transversely spaced apart longitudinally extending flanges extending outwardly therefrom to form a generally U-shaped configuration with the flat side comprising means for guiding the wood member together with the metal member in movement toward means for deforming a portion of one of the flanges of the metal member into the wood member with the flanges of the metal member extending within the recesses in the wood member in an exact finished relation of the wood member with the metal member and deforming means positioned adjacent the wood member and metal member and operably associated therewith with the flanges of the metal member extending within the recesses in the wood member in an exact finished relation of the wood member with the metal member for deforming the one flange of the metal member toward the other flange of the metal member into the wood member at the side of one of the recesses in the wood member which the one flange extends within which side is closest the other flange of the metal member to lock the wood and metal members together into a composite member as the wood and metal members are passed through the deforming means.

2. Structure as set forth in claim 1, wherein the deforming means includes a rotary deforming disc engageable with the one flange of the metal member for deforming it as it passes through the deforming means on rotation the deforming disc.

3. Structure as set forth in claim 2, wherein the other side of the one recess of the wood member is inclined outwardly of the recess so as to make the recess wider at the opening than at the bottom thereof and the deforming disc is inclined at an angle to the one flange of the metal member extending within the one recess of the wood member to substantially hide the deformation of the metal member in the composite member.

4. Structure as set forth in claim 2 and further including means for varying the position of the deforming disc including a support for the deforming disc having a lower, middle and upper plate with the lower plate being secured to the middle plate by means of bolt structure extending through first elongated slots in the middle plate and with the upper plate being secured to the middle plate by bolts extending through second elongated slots at right angles to the first slots and drive structure supporting the deforming disc from the top plate.

5. Structure as set forth in claim 2 and further including means for adjusting the inclination of the deforming disc comprising fixed tabs, a plate positioned adjacent the fixed tabs, bearing structure for the deforming disc at each side thereof, bolt means extending through slots in the fixed tabs and plate for securing the bearing structure to the plate and adjusting screws extending through the plate to vary the position of the bearing structure with respect to the plate in conjunction with the bolts extending through the tabs and plate to secure the bearing structure thereto.

6. Structure as set forth in claim 2, and further including a friction wheel secured to and driven with the deforming disc engageable with the metal member for driving the composite metal and wood member through the deforming means on rotation of the deforming disc.

7. Structure as set forth in claim 2, wherein the deforming disc is provided with peripheral angularly spaced apart projections thereon which intermittently deform the one flange of the metal member on rotation of the deforming disc to stitch the metal member to the wood member.

8. Structure as set forth in claim 1, wherein the deforming means is a deforming disc which has an outer periphery including an outer side and an inner side and the inner side is inclined toward the outer side at two separate angles to form a sharpened edge on the disc having a relatively oblique angle with respect to the angle which it would have had if the initial inclination of the inner side toward the outer side of the disc been continued to their intersection.

9. Structure as set forth in claim 1, and further including rollers in the deforming means for supporting the bottom of the metal member and each side of the composite metal and wood member for urging the metal and wood members into the predetermined relationship with each other with the flanges on the metal member extending into the recesses in the wood member.

10. Structure as set forth in claim 9, wherein the rollers are adjustable toward and away from the composite member whereby the deforming means is capable of accepting metal and wood members of different sizes.

11. Structure as set forth in claim 1, wherein the guiding means comprises rollers engageable with the bottom and top of both the metal and wood members and rollers engageable with the not engaged sides of the wood and metal members urging them toward each other with the flanges of the metal member within the recesses in the wood member.

12. Structure as set forth in claim 11, wherein the rollers are adjustable toward and away from the wood and metal members whereby different size wood and metal members may be guided by the guiding means.

13. Deforming structure for securing an elongated wood member having longitudinally extending transversely spaced apart recesses in one side thereof to an elongated metal member having at least one substantially flat side with transversely spaced apart longitudinally extending flanges extending outwardly therefrom to form a generally U-shaped configuration with the flat side, comprising means for guiding the wood member together with the metal member in movement through means for deforming a portion of only one of the flanges of the metal member into the wood member with the flanges of the metal member extending within the recesses in the wood member in an exact finished relation of the wood member with the metal member and deforming means positioned adjacent the wood member and metal member and operably associated therewith with the flanges of the metal member extending within the recesses in the wood member in an exact finished relation of the wood member with the metal member for deforming only the one flange of the metal member toward the other flange of the metal member into the wood member at the side of one of the recesses in the wood member which the one flange extends within which side is closest the other flange of the metal member to lock the wood and metal members together into a composite member as the wood and metal members are passed through the deforming means.

14. Structure as set forth in claim 13, wherein the deforming means includes a rotary deforming disc for engaging the one flange of the metal member and deforming it as it passes through the deforming means on rotation thereof.

15. Structure as set forth in claim 14, wherein the other side of the one recess of the wood member is inclined outwardly of the recess so as to make the recess wider at the opening than at the bottom thereof and the deforming disc is inclined at an angle to the one flange of the metal member extending within the one recess of the wood member to substantially hide the deformation of the metal member in the composite member.

16. Structure as set forth in claim 14, and further including means for varying the position of the deforming disc including a support for the deforming disc having a lower, middle and upper plate with the lower plate being secured to the middle plate by means of bolt structure extending through first elongated slots in the middle plate and with the upper plate being secured to the middle plate by bolts extending through second elongated slots at right angles to the first slots and drive structure supporting the deforming disc from the top plate.

17. Structure as set forth in claim 14, and further including means for adjusting the inclination of the deforming disc comprising fixed tabs, a plate positioned adjacent the fixed tabs, bearing structure for the deforming disc at each side thereof, bolt means extending through slots in the fixed tabs and plate for securing the bearing structure to the plate and adjusting screws extending through the plate to vary the position of the bearing structure with respect to the plate in conjunction with the bolts extending through the tabs and plate to secure the bearing structure thereto.

18. Structure as set forth in claim 14, and further including a friction wheel secured to and driven with the deforming disc for engaging the metal member for driving the composite metal and wood member through the deforming means on rotation of the deforming disc.

19. Structure as set forth in claim 14, wherein the deforming disc is provided with peripheral angularly spaced apart projections thereon which intermittently deform the one flange of the metal member on rotation of the deforming disc to stitch the metal member to the wood member.

20. Structure as set forth in claim 13, wherein the deforming means is a deforming disc which has an outer periphery including an outer side and an inner side and the inner side is inclined toward the outer side at two separate angles to form a sharpened edge on the disc having a relatively oblique angle with respect to the angle which it would have had if the initial inclination of the inner side toward the outer side of the disc been continued to their intersection.

21. Structure as set forth in claim 13, and further including rollers in the deforming means for supporting the bottom of the metal member and each side of the composite metal and wood member for urging the metal and wood members into the predetermined relationship with each other with the flanges on the metal member extending into the recesses in the wood member.

22. Structure as set forth in claim 21, wherein the rollers are adjustable toward and away from the composite member whereby the deforming means is capable of accepting metal and wood members of different sizes.

* * * * *